Aug. 25, 1925.
H. E. RUDOLPH ET AL
1,551,217
MEASURING DEVICE FOR DISPENSING TANKS
Filed Dec. 1, 1924
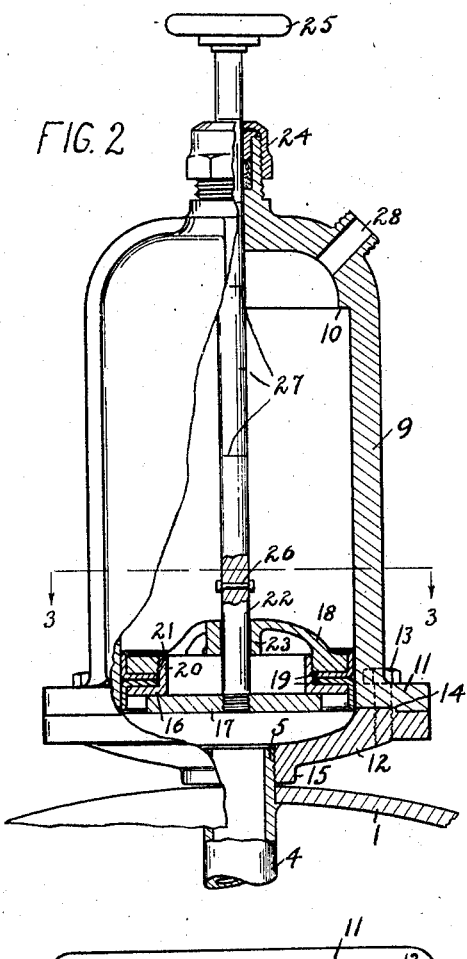
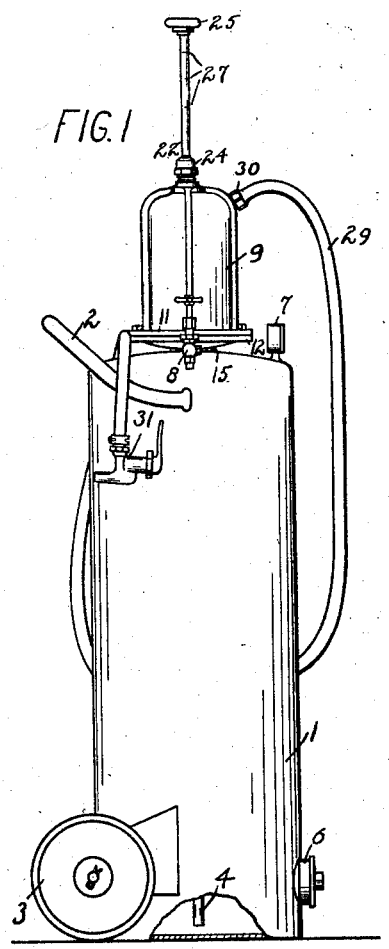
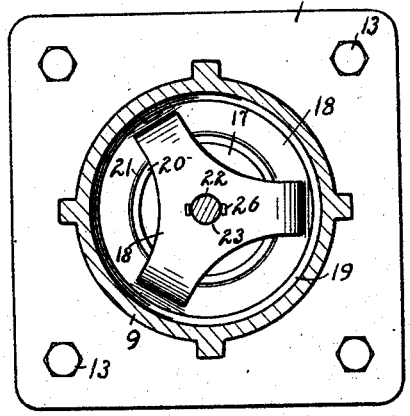
INVENTORS.
HARRY E. RUDOLPH
WALTER C. REED
BY
*R. W. Smith*
ATTORNEY.

Patented Aug. 25, 1925.

1,551,217

UNITED STATES PATENT OFFICE.

HARRY E. RUDOLPH AND WALTER C. REED, OF LOS ANGELES, CALIFORNIA; SAID REED ASSIGNOR TO SAID RUDOLPH.

MEASURING DEVICE FOR DISPENSING TANKS.

Application filed December 1, 1924. Serial No. 753,098.

*To all whom it may concern:*

Be it known that HARRY E. RUDOLPH and WALTER C. REED, citizens of the United States, residing at Los Angeles, in the county of Los Angeles and State of California, have invented certain new and useful Improvements in Measuring Devices for Dispensing Tanks, of which the following is a specification.

This invention is a measuring mechanism for a dispensing receptacle, and is particularly adapted for use in connection with a pressure operated dispensing tank.

It is the object of the invention to provide a piston control for a measuring container which communicates with the dispensing tank, so that the stroke of said piston will determine the quantity of material received in the measuring container from said tank; and to provide a normally closed discharge for the measuring container, the opening of which will cause the pressure in the dispensing tank to actuate the piston for discharging the measured quantity of material.

It is a further object of the invention to graduate the stroke of the piston, so that fractional portions of full capacity of the measuring container may be accurately measured and discharged therefrom.

It is a still further object of the invention to provide a measuring device of extremely simple construction, which may be readily attached to a usual pressure operated dispensing tank.

The invention will be readily understood from the following description of the accompanying drawings, in which:

Fig. 1 is a side elevation of the measuring device mounted on a dispensing tank.

Fig. 2 is a detail side elevation of the measuring device, partly in axial section.

Fig. 3 is a transverse section on the line 3—3 of Fig. 2.

The dispensing device upon which the measuring mechanism is mounted, is shown as a usual pressure operated grease tank 1 having handle 2 and wheel support 3 whereby it may be conveniently transported or supported in upright position, ready for use, as shown in Fig. 1.

A discharge pipe 4 extends into tank 1, and at its lower end communicates with the tank in slightly spaced relation above the base of the same, the upper end of said discharge pipe extending through the top of the tank and forming a coupling nipple 5.

Grease is supplied to the tank through an opening in its side which is provided with a closure plug 6, and any desired pressure as registered by a gauge 7, is placed on the grease in the tank so as to tend to force the same outwardly through pipe 4, by charging said tank with compressed air through a valve 8.

The measuring device is mounted on the top of the tank and comprises a container communicating with nipple 5 at its base, and having a normally closed discharge at its upper end. A piston reciprocates in the container, and a valve cooperates therewith so as to open as the piston is forced downwardly in the container, in order that the pressure in tank 1 may force grease through the open valve and into the space above the piston, thereby measuring any desired quantity of the grease, depending upon the stroke of the piston. When the discharge at the top of the measuring container is subsequently opened, the pressure in tank 1 forces the piston upwardly with the valve closed, so as to discharge the measured quantity of material through the open discharge.

As an instance of this arrangement, the measuring mechanism is shown as comprising a container 9 having an interior shoulder 10 adjacent its closed upper end, and provided with a flanged open base 11. The flanged base is fixed upon a coupling flange 12 by bolts 13, the adjacent surfaces of said flanges forming a cooperating male and female joint 14, and the bottom of the coupling flange forming a nipple 15 adapted to screw onto the nipple 5 of the discharge pipe of the grease tank.

The piston which reciprocates in container 9 comprises an annulus 16 forming a valve seat, and a cooperating spider 18 above the same, with cup washers 19 between said annulus and said spider and fitting snugly in the bore of the container.

The cup washers are arranged back to back so as to extend over the peripheries of annulus 16 and spider 18, and said annulus has an upstanding flange 20 at the rim of its central opening, which projects through central openings in the cup washers for threaded engagement with the rim 21 of a central opening through spider 18, thereby clamping the cup washers in place and providing a piston having a central opening extending through the same.

A valve head 17, adapted to seat against the lower face of annulus 16 so as to close the opening through the piston, is mounted on a rod 22 which extends upwardly through the central opening in the piston and through a guide bearing 23 formed by spider 18. The upper end of the rod extends through the top of container 9 which is provided with a stuffing box 24, and terminates in a handle 25.

A pin 26 extends through rod 22 at a point spacing said pin above the guide bearing 23 when valve 17 is closed, so that depression of the rod will initially open the valve, and continued depression thereof will force the piston downwardly through container 9 by the abutment of pin 26 against guide bearing 23.

The rod 22 is provided with graduations 27 cooperating with the upper end of stuffing box 24, to indicate fractional or full depression of the piston between its limits of movement as determined by shoulder 10 and the base of coupling flange 12. The piston may thus be depressed to form a space above the same of any desired, measured capacity.

A discharge nipple 28 projects from container 9 above the upper limit of movement of the piston, and a hose 29 is connected thereto by a coupling 30, with the end of said hose provided with a usual, normally closed, valvular discharge nozzle 31.

By the construction as thus described it will be seen that with the piston at its upper limit of movement as shown in Fig. 1, valve 17 may be readily opened by manual depression of the operating rod, and by continued depression of said rod the piston will be lowered to form a space of desired measured capacity above the same. The pressure in tank 1 forces grease through the open valve so as to fill the measured space, and when nozzle 31 is subsequently opened so as to relieve the pressure against the upper face of the piston, the pressure in tank 1 will close valve 17 and force the piston upwardly to its limit of movement in container 9, and thereby discharge the measured quantity of grease through hose 29 and the open nozzle 31.

It will be apparent that various changes may be made in the construction, combination, and arrangement of parts as thus described without departing from the spirit of the invention.

What is claimed is:

1. The combination with a dispensing tank having a pressure discharge, of a measuring container communicating with said discharge and having an outlet, a valvular nozzle communicating with said outlet, means for forming a measuring chamber of desired capacity in said container, means for filling said chamber with material from said tank when said nozzle is closed, and means controlled by the opening of said nozzle for causing the pressure through said discharge to force the material in said measuring chamber through said outlet.

2. The combination with a dispensing tank having a pressure discharge, of a measuring container communicating at one end with said discharge and having a normally closed outlet at its opposite end, a piston adapted to reciprocate in said container, a valve cooperating therewith, and means for opening said valve as the piston is moved toward said pressure discharge, said open valve causing communication between said pressure discharge and the space in said container between its outlet end and said piston, and the parts being arranged whereby opening of said normally closed outlet will close said valve and move said piston in the opposite direction by the pressure through said discharge.

3. The combination with a dispensing tank having a pressure discharge, of a measuring container communicating with said discharge and having an outlet, a valvular nozzle communicating with said outlet, means for forming a measuring chamber of desired capacity in said container, means for gauging the capacity of said chamber, means for filling said chamber with material from said tank when said nozzle is closed, and means controlled by the opening of said nozzle for causing the pressure through said discharge to force the material in said measuring chamber through said outlet.

4. The combination with a receptacle having pressure discharge means, of a container communicating with said pressure discharge means and having a normally closed outlet, a piston adapted to reciprocate in the container between said pressure discharge means and said outlet, and a valvular port having means for opening the same by movement of the piston toward the pressure discharge means to cause communication between said pressure discharge means and the space in the container at the opposite side of the piston, the parts being arranged whereby opening of the normally closed outlet will close the valvular port and move the piston toward said outlet.

5. The combination with a dispensing tank having a pressure discharge, of a measuring container communicating at one end with said discharge and having a normally closed outlet at its opposite end, means for forming a measuring chamber of desired capacity in said container at the outlet end thereof, means for filling said chamber through said pressure discharge, and means controlled by the opening of said normally closed outlet for causing the pressure through said discharge to force the material in said measuring chamber through said outlet.

In testimony whereof we have affixed our signatures to this specification.

HARRY E. RUDOLPH.
WALTER C. REED.